(No Model.)

J. O. INGLE, Jr., T. R. STEDMAN & R. J. LAWSON.
HARROW DISK SHARPENER.

No. 508,719. Patented Nov. 14, 1893.

Witnesses.
A. Ruppert
G. B. Towles

Inventors.
Jacob O. Ingle Jr
Robert J. Lawson
Thomas R. Stedman
Per
Thomas P. Simpson
atty

UNITED STATES PATENT OFFICE.

JACOB ODEN INGLE, JR., THOMAS R. STEDMAN, AND ROBERT J. LAWSON, OF AUBURN, TEXAS.

HARROW-DISK SHARPENER.

SPECIFICATION forming part of Letters Patent No. 508,719, dated November 14, 1893.

Application filed June 16, 1893. Serial No. 477,801. (No model.)

*To all whom it may concern:*

Be it known that we, JACOB ODEN INGLE, Jr., THOMAS R. STEDMAN, and ROBERT J. LAWSON, citizens of the United States, residing at Auburn, in the county of Ellis and State of Texas, have invented certain new and useful Improvements in Harrow-Disk Sharpeners; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to devise some means by which disk harrows may be put in proper condition for work after the edges have been battered by coming in contact with rocks in the soil or roots or other resistance not contemplated, or have become dulled by wear.

The invention consists in the particular means by which we sharpen the circular cutting edges of the disks as hereinafter described.

Figure 1:
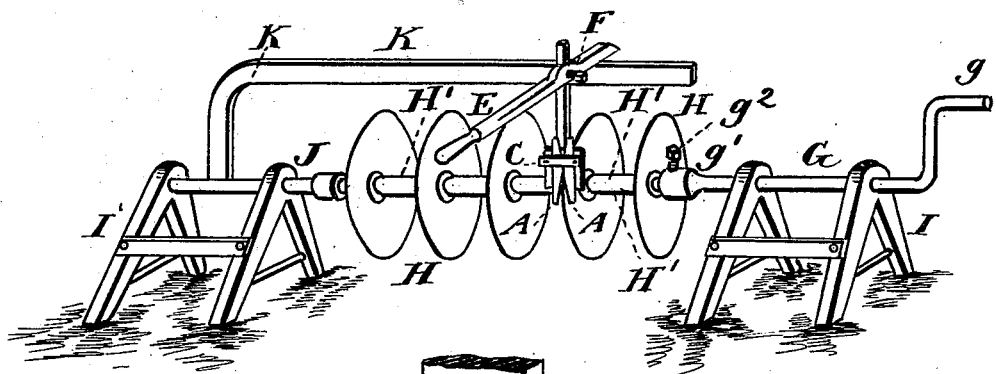
Figure 2:
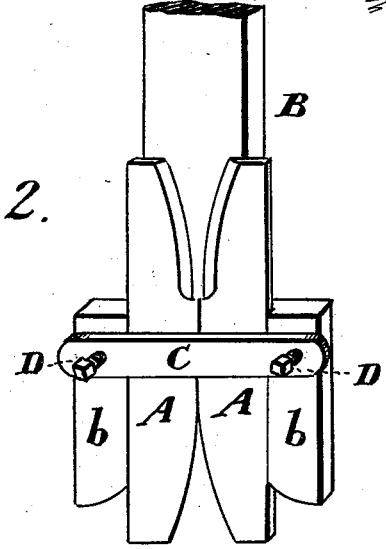
Figure 3:
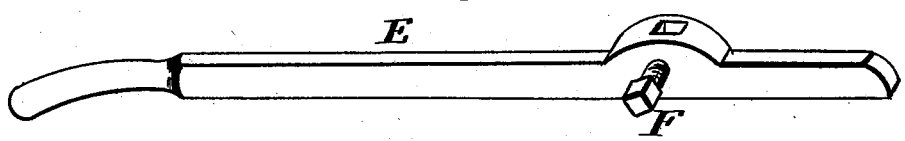

Figure 1 of the drawings is a perspective view showing the sharpening blades, their holder and the handle to which they are attached, and Fig. 2 a detail view of the sharpening blades when unattached. Fig. 3 is a detail view.

In the drawings A A represent the two blades by which a proper edge may be restored to every disk of the harrow in a very short time and in a very perfect manner. It will be noticed that the working faces on each blade are placed on both ends but upon opposite sides so as to be reversible and doubly durable.

B is the holder which has two forks $b$ $b$ at one end and opposite to the opening between the forks in the V-shaped opening between the edges of the blades. In these openings the disk is brought and acted upon to bring it into proper shape. The blades A A are secured to the forks or bifurcations $b$ $b$ by means of a cross bar C which is fastened detachably by the screws D D to the forks. The shank of the holder B passes up through the handle E and is held thereto by the screw F or any equivalent device.

In order to sharpen the disk, we use a hand crank shaft G with handle $g$ and socket $g'$ having set-screw $g^2$. The disks H fast on their shaft H' are rotated by shaft G which is journaled in frame I while the shaft H' turns in an end-bearing of a rod J fast in a frame I'. The rod J supports a right angled bar K on which rests the handle while the sharpener is held by hand to the disk.

What we claim as new, and desire to protect by Letters Patent, is—

The hand crank shaft G having socket $g'$, the frames I I', the rod J having end-bearing and the bar K in combination with the handle E and sharpener as shown and described.

In testimony whereof we affix our signatures in presence of two witnesses.

JACOB ODEN INGLE, JR.
THOMAS R. STEDMAN.
ROBERT J. LAWSON.

Witnesses:
JAMES O. DORRIS,
F. P. LAWSON.